United States Patent
Agehari

(10) Patent No.: US 7,095,795 B1
(45) Date of Patent: Aug. 22, 2006

(54) MULTI-RATE TRANSMISSION APPARATUS

(75) Inventor: Mitsuhiro Agehari, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/540,289

(22) Filed: Mar. 31, 2000

(30) Foreign Application Priority Data

Mar. 31, 1999 (JP) .................................. 11-093099

(51) Int. Cl.
H04L 27/20 (2006.01)

(52) U.S. Cl. .................................................... 375/295

(58) Field of Classification Search ................ 375/259, 375/260, 262, 265, 279, 280, 295, 308, 329, 375/331, 341; 714/751, 752, 756, 784, 786, 714/789, 790, 792, 798; 332/106, 107, 108, 332/104, 149, 159; 370/206, 208, 482, 465, 370/468
See application file for complete search history.

(56) References Cited

U.S. PATENT DOCUMENTS

| | | | | | |
|---|---|---|---|---|---|
| 4,721,928 | A | * | 1/1988 | Yoshida .......................... 332/104 |
| 4,937,844 | A | * | 6/1990 | Kao .............................. 375/240 |
| 4,980,897 | A | * | 12/1990 | Decker et al. ................ 375/265 |
| 5,197,061 | A | | 3/1993 | Halbert-Lassalle et al. |
| 5,420,887 | A | * | 5/1995 | Rhodes et al. ............... 375/295 |
| 5,691,995 | A | * | 11/1997 | Ikeda et al. ................... 714/786 |
| 5,764,699 | A | * | 6/1998 | Needham et al. ............ 375/261 |
| 5,815,046 | A | * | 9/1998 | Spilker et al. ............... 332/103 |
| 6,084,919 | A | * | 7/2000 | Kleider et al. ............... 375/285 |
| 6,122,310 | A | * | 9/2000 | Ziemer et al. ................ 375/142 |
| 6,169,767 | B1 | * | 1/2001 | Strolle et al. ................ 375/302 |
| 6,175,550 | B1 | * | 1/2001 | van Nee ....................... 370/206 |
| 6,233,711 | B1 | * | 5/2001 | Murayama et al. .......... 714/786 |
| 6,370,202 | B1 | * | 4/2002 | Wolcott ........................ 375/295 |
| 6,421,396 | B1 | * | 7/2002 | Hawley et al. .............. 375/308 |

FOREIGN PATENT DOCUMENTS

| | | |
|---|---|---|
| EP | 0998069 | 5/2000 |
| JP | 2-298139 | 12/1990 |
| JP | 3-289822 | 12/1991 |
| JP | 6-104942 | 4/1994 |
| JP | 6-332668 | 12/1994 |
| JP | 7-321673 | 12/1995 |
| JP | 9-135275 | 5/1997 |
| JP | 10-163883 | 6/1998 |

* cited by examiner

Primary Examiner—Khanh Tran
(74) Attorney, Agent, or Firm—Dickstein, Shapiro, Morin & Oshinsky, LLP.

(57) ABSTRACT

A multi-rate transmission apparatus wherein components operate with a single clock from the outside and, even if the modulation system and the coding rate are varied arbitrarily by switching of the modulation operation mode similarly from the outside, transmission data can be allocated to modulation data and transmitted in response to the variation of the modulation system and the coding rate only with the clock signal from the outside. The multi-rate transmission apparatus includes a data processing section for reading in data with a bit width suitable for the modulation system, a coding unit for performing coding processing parallelly for the data read in by the data processing section, and a transmission section for transmitting the data, for which the coding processing has been performed, in response to the variation of the modulation system and the coding rate.

3 Claims, 9 Drawing Sheets

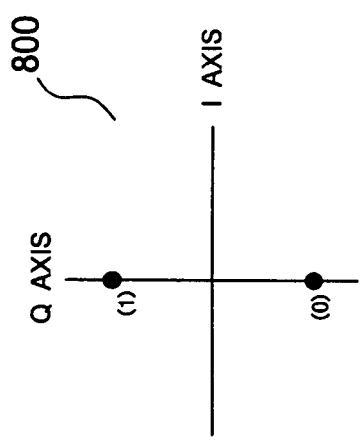
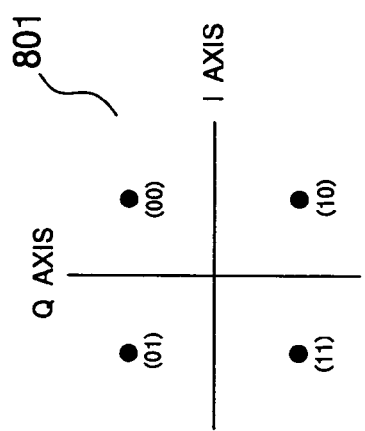
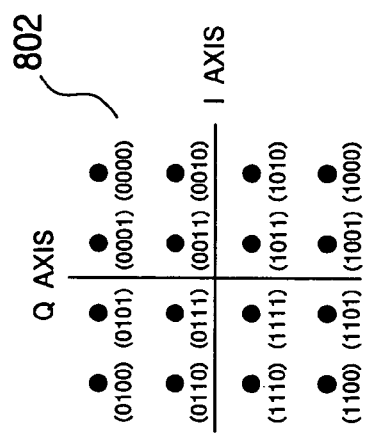
FIG.8  PRIOR ART

MULTI-RATE TRANSMISSION APPARATUS

BACKGROUND OF THE INVENTION

1. Field of the Invention

This invention relates to a multi-rate transmission apparatus which is ready for multi-rate transmission without varying a transmission processing rate even if a phase modulation system or a coding rate is varied.

2. Description of the Related Art

Phase modulation systems include a two-phase type phase modulation (phase-inversion modulation) system, a polyphase phase modulation system and an orthogonal amplitude modulation system. FIG. 8 illustrates relationships between codes and data of the modulation systems on a coordinate system represented by a real axis and an imaginary axis.

Referring to FIG. 8, reference numeral 800 denotes an example of BPSK (Binary Phase Shift Keying) which is a two-phase type modulation system, 801 an example of QPSK (Quadrature Phase Shift Keying) which is a polyphase phase modulation system, and 802 an example of 16QAM (16 Quadrature Amplitude Modulation) which is an orthogonal amplitude modulation system.

In BPSK, data is represented with "0" and "1" on the coordinate system, and a code corresponding to a point on the coordinate system is transmitted with a carrier. In QPSK which is a polyphase phase modulation system, data is represented with 2 bits called dibits, and a corresponding code is transmitted. Meanwhile, in the 16QAM of an orthogonal amplitude modulation system, data is represented with 4 bits.

In order to vary the phase modulation system, it is necessary to re-arrange and transmit data for each number of bits suitable for the modulation system.

As an apparatus for varying the modulation system or the coding rate, a variable coding rate error correction transmission apparatus is conventionally known and disclosed, for example, in Japanese Patent Laid-Open No. Hei 10-163883.

The transmission apparatus mentioned is illustrated at FIG. 9 and includes an input signal production apparatus 11, a parallel to serial converter 12, a convolution coding unit 13, a puncture circuit 14, a clock generation circuit 15, a clock sampling out circuit 16, a ½ frequency divider 17, and a ⅛ frequency divider 18.

In the transmission apparatus, parallel data DATAB outputted from the input signal production apparatus 11 is supplied to the parallel to serial converter 12, by which it is converted into another parallel data DATA.

The clock sampling out circuit 16 samples out n clocks CLK0 from m clocks CLK0 outputted from the clock generation circuit 15 based on a coding rate (m−n)/m to produce a data readout clock signal CLK.

The convolution coding unit 13 performs two kinds of convolution operation and outputs coded data CDATA1 and CDATA2 with error correction codes added thereto in synchronism with the clock signal CLK.

The puncture circuit 14 deletes data at predetermined positions from the parallel coded data in accordance with the coding rate and outputs transmission symbol data in synchronism with a symbol clock signal CLKS.

However, where the modulation system or the coding rate is varied with the conventional system, it is often the case that, if the data transfer rate increases, then the rate of a reference clock signal in the circuit is raised or a plurality of different clocks are used in accordance with the increase of the data transfer rate. In the transmission apparatus disclosed in Japanese Patent Laid-Open No. Hei 10-163883 mentioned above, a transmission clock signal is produced by sampling out a reference clock signal. However, in order to raise the data transfer rate with the transmission apparatus, the rate of the reference clock signal must be raised.

SUMMARY OF THE INVENTION

It is an object of the present invention to provide a multi-rate transmission apparatus by which, even if the modulation system or the coding rate is varied to raise the data transfer rate, circuit operation and transmission operation can be performed always with a single clock signal without the necessity to vary an internal operation clock signal.

In order to attain the object described above, according to the present invention, there is provided a multi-rate transmission apparatus wherein a modulation system and a coding ratio are varied in accordance with a modulation operation mode given thereto from the outside to allow a transmission operation with a single clock signal inputted from the outside, comprising data processing means for reading in data with a bit width suitable for the modulation system, coding means for performing coding processing parallelly for the data read in by the data processing means, and transmission means for transmitting the data, for which the coding processing has been performed, in accordance with the varied modulation system and coding ratio.

The data processing means may include a transmission memory for storing transmission data of m-bit strings where m is a natural number and varies in accordance with the modulation system, means for assembling the data of m-bit strings into data of n-bit strings fixed to be used for coding processing, n being a natural number, and a memory for temporarily storing the data of n-bit strings.

The parallel coding means may include a register set for storing data of n-bit strings, n being a natural number, a plurality of convolution coding circuits for fetching the data of n-bit strings from the register set and performing convolution processing for the data of n-bit strings in a unit of n-bit strings fixed, a puncture circuit for performing puncture processing for coding results outputted from the plurality of convolution coding circuits and outputting coded data, and a data discrimination circuit for discriminating bits corresponding to the coded data outputted from the puncture circuit.

The transmission means may include a transmission control circuit for determining a transmission timing, a modulation data allocation circuit for allocating the coded data to modulation data, and a transmission circuit for transmitting the modulation data at a clock timing from the transmission control circuit.

In a modem which employs the phase modulation system, an actual data transfer rate is varied by a method wherein the coding rate is varied by a modulation system and/or convolution coding and puncture processing. Further, a sampling clock signal upon transmission is determined based on an apparatus and a characteristic without depending upon the modulation system or the coding rate.

In the multi-rate transmission apparatus, even if the modulation system and the coding rate are varied arbitrarily, components in the circuit can operate with a single block signal, and data can be transmitted at a data transfer rate suitable for the modulation system and the coding rate using the inputted clock signal as a transmission clock signal.

With the multi-rate transmission apparatus, data is transmitted in a unit of a number of bits suitable for the modulation system and an increase of the processing rate of convolution processing and puncture processing is achieved by performing them by parallel processing of fixed strings.

Further, an internal processing time difference which arises from the modulation system or the coding rate is absorbed by controlling operation by means of a timing control circuit to allow intra-circuit processing operation and transmission operation with a single clock.

With the multi-rate transmission apparatus, even where the modulation system or the coding rate is varied to raise the transfer rate, there is no necessity of varying the transmission clock and the internal operation clock, and circuit operation and transmission operation always with a single clock are allowed.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 8 is a diagrammatic view showing coordinates according to different modulation systems defined conventionally.

DESCRIPTION OF THE PREFERRED EMBODIMENT

Figure 1:
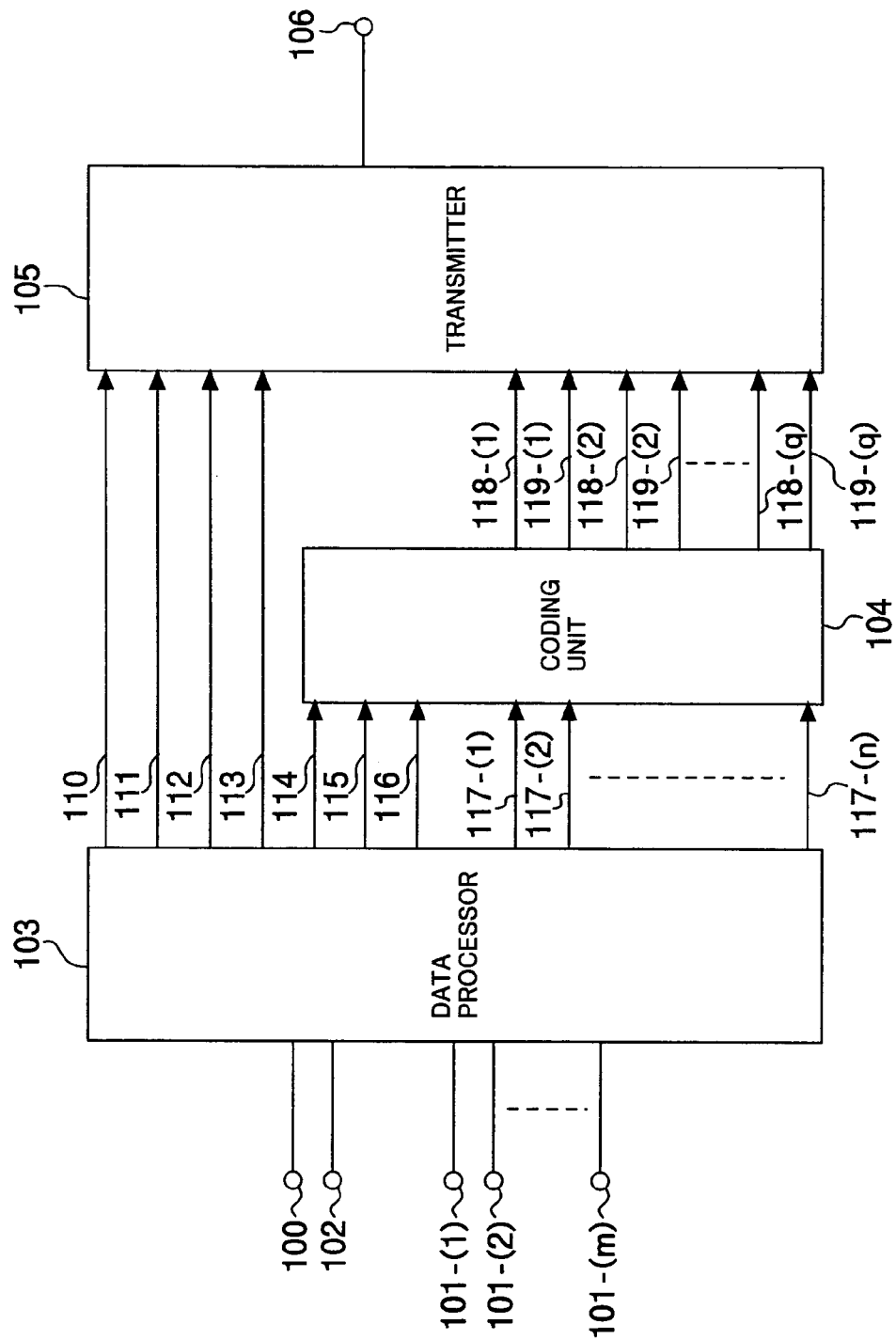
FIG. 1 is a block diagram showing a multi-rate transmission apparatus to which the present application is applied.

Referring to FIG. 1, there is shown a multi-rate transmission apparatus to which the present invention is applied. The multi-rate transmission apparatus includes an external clock input terminal 100, m data input terminals 101-(1) to 101-(m), a modulation operation mode input terminal 102, a data processor 103, a coding unit 104, a transmitter 105, and a data output terminal 106.

The multi-rate transmission apparatus outputs data inputted from the outside through the data input terminals 101-(1) to 101-(m) as transmission data from the data output terminal 106 using a clock timing inputted similarly from the outside through the external clock input terminal 100 and an operation mode inputted through the modulation operation mode input terminal 102.

The data processor 103 reads in data with a bit width suitable for the modulation system and rearranges the data so that they may have a bit width of n strings fixed for allowing parallel coding processing by the coding unit.

Further, since the data is delayed by a fixed time (time corresponding to a clock signal) in the inside of the data processor 103 in accordance with the modulation system, a time arising from the variation of the modulation system to a different one can be absorbed.

To this end, the data processor 103 fetches the data from the data input terminals 101-(1) to 101-(m) based on the clock timing inputted from the external clock input terminal 100 and the operation mode inputted from the modulation operation mode input terminal 102 and indicative of a modulation system.

The value of m varies depending upon the operation mode inputted to the modulation operation mode input terminal 102. For example, the operation mode is BPSK when '0' is inputted to the modulation operation mode input terminal 102, but is 16QAM when '1' is inputted.

Since, in BPSK, data is represented by 1 bit of '0' or '1' on the coordinate axis, the value of m is m=1. Meanwhile, since, in 16QAM, data is represented by 4 bits from '0000' to '1111' on the coordinate axes, the value of m is m=4.

Then, the data processor 103 assembles the fetched data into data of n strings fixed which can be processed in parallel by the coding unit 104 and outputs the resulting data to n data output lines 117-(1) to 117-(n).

Thereupon, the data processor 103 outputs the clock timing obtained from the external clock input terminal 100 over a coding operation clock line 114, outputs the operation mode obtained from the modulation operation mode input terminal 102 over a coding operation mode line 115 and outputs a coding starting notification over a coding control line 116 to the coding unit 104 in accordance with the clock timing.

In order to make it possible to perform coding processing up to a maximum transfer rate even with a slow clock, the coding unit 104 performs coding parallelly for the data of n strings fixed which have been re-arranged by the data processor 103. The coding is performed with a coding ratio suitable for the operation mode, and data of q strings suitable for the operation mode is outputted.

Particularly, the coding unit 104 performs parallel coding processing for n strings fixed and parallel puncture processing based on the clock timing, the operation mode and the coding starting notification sent thereto from the data processor 103.

The coding unit 104 outputs a processing result of q strings obtained by the processing described above as coded data to coded data output lines 119-(1) to 119-(q). When the outputted coded data are valid, the coding unit 104 outputs a data validity notification to data discrimination control lines 118-(1) to 118-(q) which correspond to the coded data output lines 119-(1) to 119-(q), respectively.

The transmitter 105 receives the clock timing over a transmission control clock line 110, receives the operation mode over a transmission operation mode line 111 and receives the transmission starting notification over a transmission control line 112 all transmitted thereto simultaneously from the data processor 103 at a timing determined taking the processing time of the coding unit 104 into consideration.

Thereupon, the transmitter 105 discriminates and fetches the coded data outputted from the coding unit 104 together with the data validity notification. Then, when the transmission starting notification is received from the data processor 103 over a transmission output line 113, the transmitter 105 allocates the fetched coded data to modulation data in accordance with the operation mode and outputs resulting data to the transmission data output line 106.

Subsequently, the operation described above is described with reference to a timing chart of FIG. 2.

Figure 2:
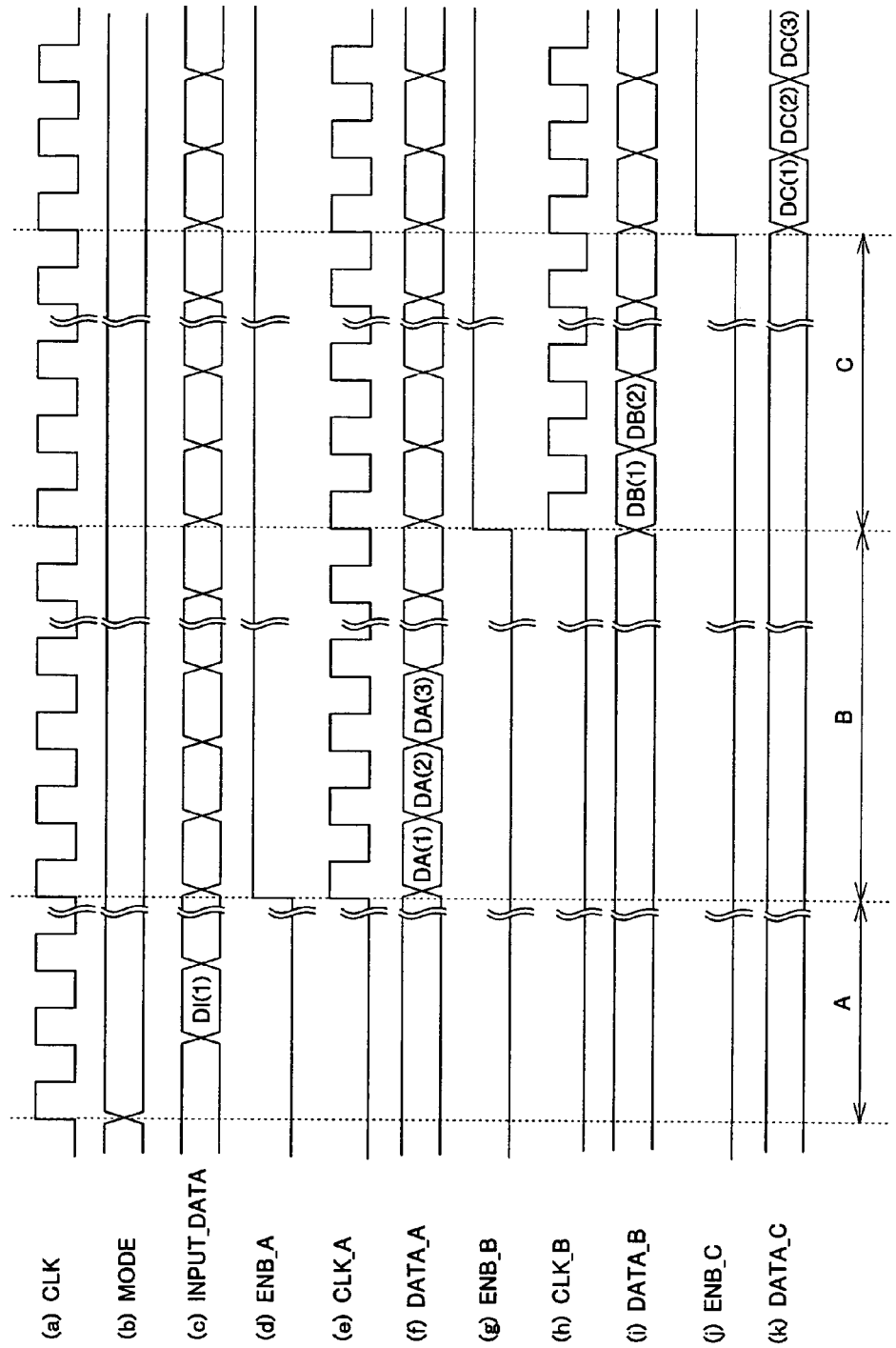
FIG. 2 is a timing chart illustrating operation of the multi-rate transmission apparatus of FIG. 1.

Reference character CLK of the waveform (a) of FIG. 2 denotes a clock timing inputted to the external clock input terminal 100, MODE of the waveform (b) an operation mode inputted to the modulation operation mode input terminal 102, and INPUT_DATA of the waveform (c) transmission data inputted to the data input terminals 101-(1) to 101-($m$).

The data processor 103 fetches the transmission data INPUT_DATA of the waveform (c) in accordance with the operation mode MODE of the waveform (b) at the clock timing CLK of the waveform (a).

The time A in FIG. 2 denotes a data fetching time Ta1 and an assembly processing time Ta2 to n strings by the data processor 103, and represents a period for assuring a number of data necessary before processing for transmission is performed.

The data fetching time Ta1 and the assembly processing time Ta2 to n strings rely upon the bit number m handled with the transmission data INPUT_DATA of the waveform (c), and if the bit number increases, then they decrease in proportion to it. In short, A=(Ta1+Ta2)/m.

Meanwhile, the bit number m depends upon the operation mode MODE of the waveform (b). For the period A of FIG. 2, the data processor 103 which have fetched the transmission data INPUT_DATA of the waveform (c) provides the clock timing CLK_A of the waveform (e) over the coding operation clock line 114, the operation timing ENB_A of the waveform (d) and the data assembled to n strings DATA_A of the waveform (f) over the data output lines 117-(1) to 117-($n$), to the coding unit 104.

The coding unit 104 performs coding processing and puncture processing at the clock timing CLK_A of the waveform (e) for the data DATA_A of the waveform (f) assembled to n strings and given over the data output lines 117-(1) to 117-($n$).

The time B of FIG. 2 denotes a coding processing time Tb1 and a puncture processing time Tb2 by the coding unit 104. Since the coding unit 104 normally performs parallel coding processing of n strings fixed and parallel puncture processing, the period B of FIG. 2 is fixed irrespective of the operation mode of BPSK or 16QAM.

Since the clock timing CLK_A of the waveform (e) is the same as the clock timing inputted from the external clock input terminal 100 to the data processor 103, the data processor 103 can discriminate the period B of FIG. 2 which is required by the coding unit 104.

After the data processor 103 waits for the period B of FIG. 2, it provides the clock timing CLK_B of the waveform (h) over the transmission control clock line 110 and the operation timing ENB_B of the waveform (g) over the transmission control line 112 to the transmitter 105.

The transmitter 105 looks over the data validity notification of the data discrimination control lines 118-(1) to 118-($q$) and fetches the coded data DATA_B of the waveform (i) outputted from the coded data output lines 119-(1) to 119-($q$) of the coding unit 104.

The time C of FIG. 2 denotes a coded data fetching time Tc, which is a period for assuring the number of data necessary to start transmission. The coded data fetching time Tc relies upon the bit number m which depends upon the operation mode MODE of the waveform (b), and increases proportionally if the bit number increases. In short, C=m·Tc.

The clock timing CLK_B of the waveform (h) is the same as the clock timing inputted from the external clock input terminal 100 to the data processor 103, and since a valid data width q of the coded data output lines 119-(1) to 119-($q$) outputted from the coding unit 104 is fixed depending upon the operation mode, the data processor 103 can discriminate the period C of FIG. 2 necessitated by the transmitter 105.

After the data processor 103 waits for the period C of FIG. 2, it provides the transmission output notification ENB_C of the waveform (j) over the transmission output line 113 to the coding unit 104.

The coding unit 104 to which the transmission output notification is provided outputs the transmission data DATA_C of the waveform (k) to the data output terminal 106.

Therefore, by controlling the periods for assuring the data numbers for the periods A and C of FIG. 2, the transmission data can be outputted only at the clock timing CLK of the waveform (a) inputted from the external clock input terminal 100.

Figure 3:
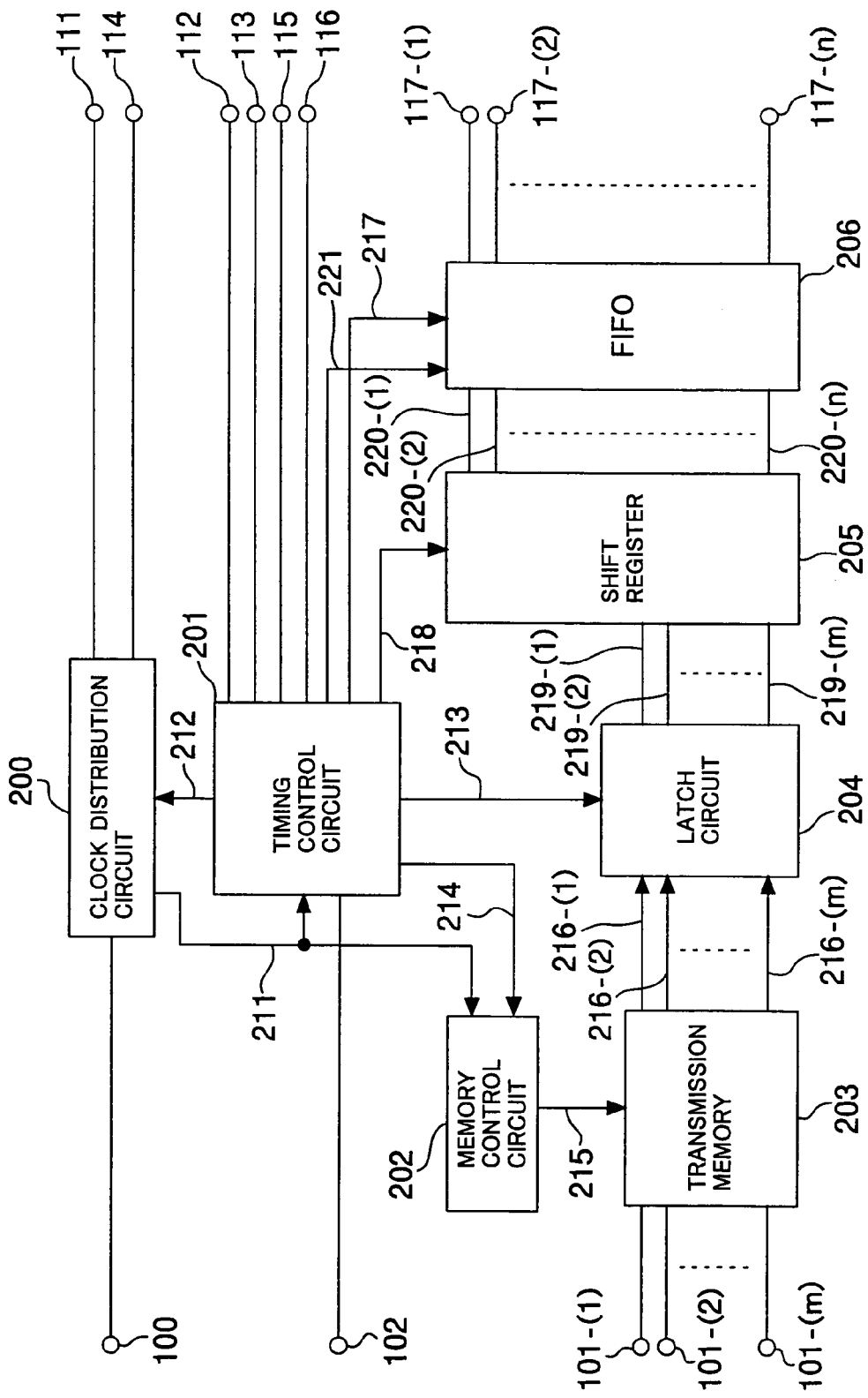
FIG. 3 is a block diagram showing a form of a data processor shown in FIG. 1.

The data processor 103 can be constructed, for example, in such a manner as shown in FIG. 3. Referring to FIG. 3, the data processor 103 includes a clock distribution circuit 200, a timing control circuit 201, a memory control circuit 202, a transmission memory 203, a latch circuit 204, a shift register 205, and a FIFO circuit 206.

When a clock timing is inputted from the external clock input terminal 100 to the clock distribution circuit 200, the clock distribution circuit 200 provides the clock timing to the timing control circuit 201 and the memory control circuit 202 over a control operation clock line 211.

The timing control circuit 201 receives the operation mode inputted from the modulation operation mode input terminal 102 at the given clock timing.

The timing control circuit 201 which receives the operation mode notifies the memory control circuit 202 of the number of data to be stored into the transmission memory 203 over a memory operation indication line 214.

The number of data to be stored is set for each operation mode. For example, where the operation mode is BPSK, the bit number m inputted over the data input terminals 101-(1) to 101-($m$) is m=1, but where the operation mode is 16QAM, the but number m is m=4.

The memory control circuit 202 stores a number of data inputted over the data input terminals 101-(1) to 101-($m$) equal to the notified data number into the transmission memory 203 over a memory control line 215. When the notified data number is reached, the memory control circuit 202 successively outputs data from transmission data output lines 216-(1) to 216-($m$).

The latch circuit 204 receives a latch timing given thereto from the timing control circuit 201 over a latch control line 213 and temporarily latches valid data outputted over the transmission data output lines 216-(1) to 216-($m$). The latch circuit 204 outputs the latched data to latch data output lines 219-(1) to 219-($m$) until a next latch timing is received.

The shift register 205 receives a shift timing given thereto from the timing control circuit 201 over a shift control line 218 and fetches the data outputted to the latch data output lines 219-(1) to 219-($m$).

It is to be noted that it is possible to construct the multi-rate transmission apparatus otherwise such that the latch circuit 204 is omitted and the shift register 205 receives a shift timing given thereto from the timing control circuit 201 over the shift control line 218 and directly fetches data outputted to the transmission data output lines 216-(1) to 216-($m$).

After the timing control circuit 201 stores data of n bit strings into the shift register 205, it provides a FIFO write timing to the FIFO circuit 206 over a FIFO write control line 217.

The FIFO circuit 206 delays the data for a time suitable for the modulation system to absorb a time originating from variation of the modulation system, that is, selection of a different modulation system.

Particularly, the FIFO circuit 206 receives the FIFO write timing and fetches data outputted to shift register data output lines 220-(1) to 220-(n).

The timing control circuit 201 outputs the clock timing inputted thereto from the external clock input terminal 100 to the clock distribution circuit 200 over a distribution clock control line 212 to the coding operation clock line 114.

Then, the timing control circuit 201 outputs the operation mode to the coding operation mode line 115 and outputs the operation timing to the coding control line 116, and outputs a signal over a FIFO data output control line 221 to the FIFO circuit 206 so that the FIFO circuit 206 outputs the data to the data output lines 117-(1) to 117-(n).

After the timing control circuit 201 waits for the processing time of the coding unit 104, it outputs a signal over the distribution clock control line 212 to the clock distribution circuit 200. The clock distribution circuit 200 thus outputs the operation mode over the transmission operation mode line 111 and outputs the operation timing over the transmission control line 112 based on the clock timing inputted thereto from the external clock input terminal 100.

Further, when the number of coded data stored in the transmitter 105 becomes equal to the number of data which can be transmitted, the timing control circuit 201 outputs a signal of starting of transmission to the transmission output line 113.

Figure 4:
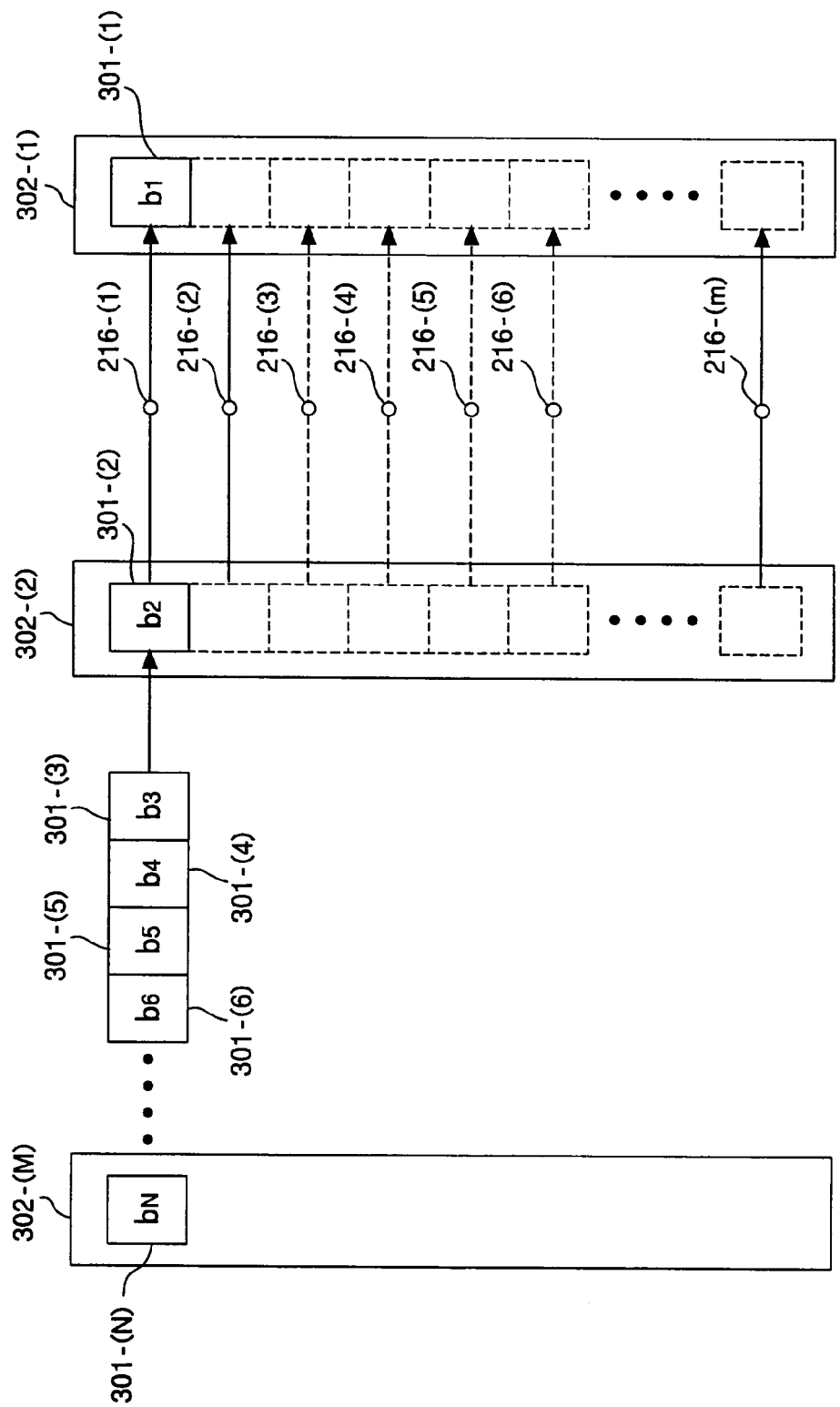
FIG. 4 is a diagrammatic view illustrating an example of a definition of bits and data where the modulation system is BPSK.
Figure 5:
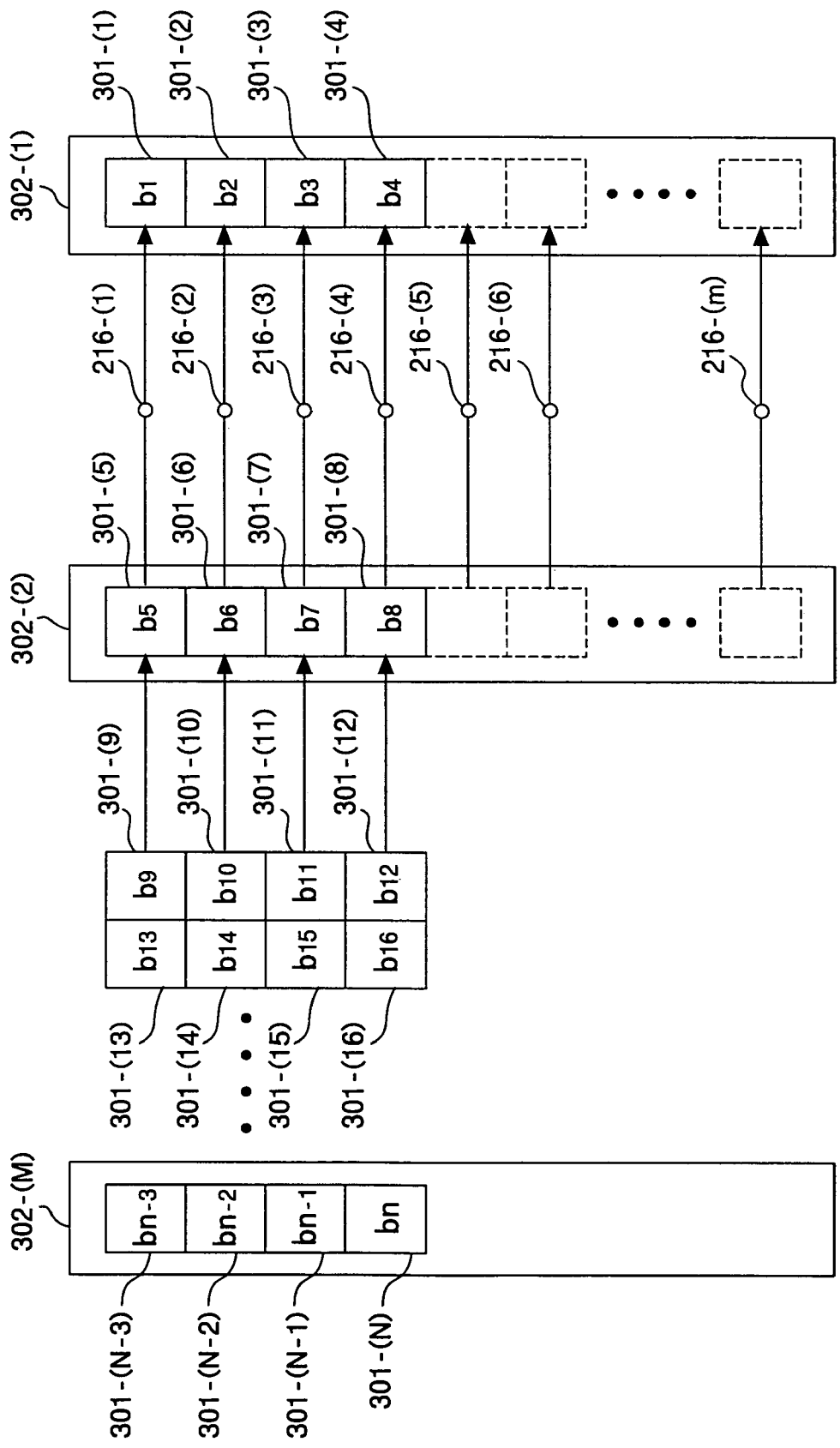
FIG. 5 is a similar view but illustrating an example of a definition of bits and data where the modulation system is 16QAM.

The definition of data to be stored into the transmission memory 203 can be described, for example, as illustrated in FIG. 4 or 5. FIG. 4 illustrates the definition where the modulation system is BPSK.

Referring to FIG. 4, reference characters 301-(1) to 301-(N) denote transmission bits, and 302-(1) to 302-(M) transmission data.

The transmission data 302-(1) to 302-(M) are written into the transmission memory 203 through the data input terminals 101-(1) to 101-(m), and the transmission data output lines 216-(1) to 216-(m) are inputted to the shift register 205.

The relationship between the transmission bits 302-(1) to 302-(N) and the transmission bits 301-(1) to 301-(M) is 302-(1)=301-(1), 302-(2)=301-(2), . . . 302-(M)=301-(N), and M=N.

FIG. 5 illustrates the definition where the modulation system is 16QAM. The relationship between the transmission bits 301-(1) to 301-(N) and the transmission data 302-(1) to 302-(M) is 302-(1)=[301-(1), 301-(2), 301-(3), 301-(4)], 302-(2)=[301-(5), 301-(6), 301-(7), 301-(8)], . . . 302-(M)=[301-(N-3), 301-(N-2), 301-(N-1), 301-(N)], and M=N/4.

Figure 6:
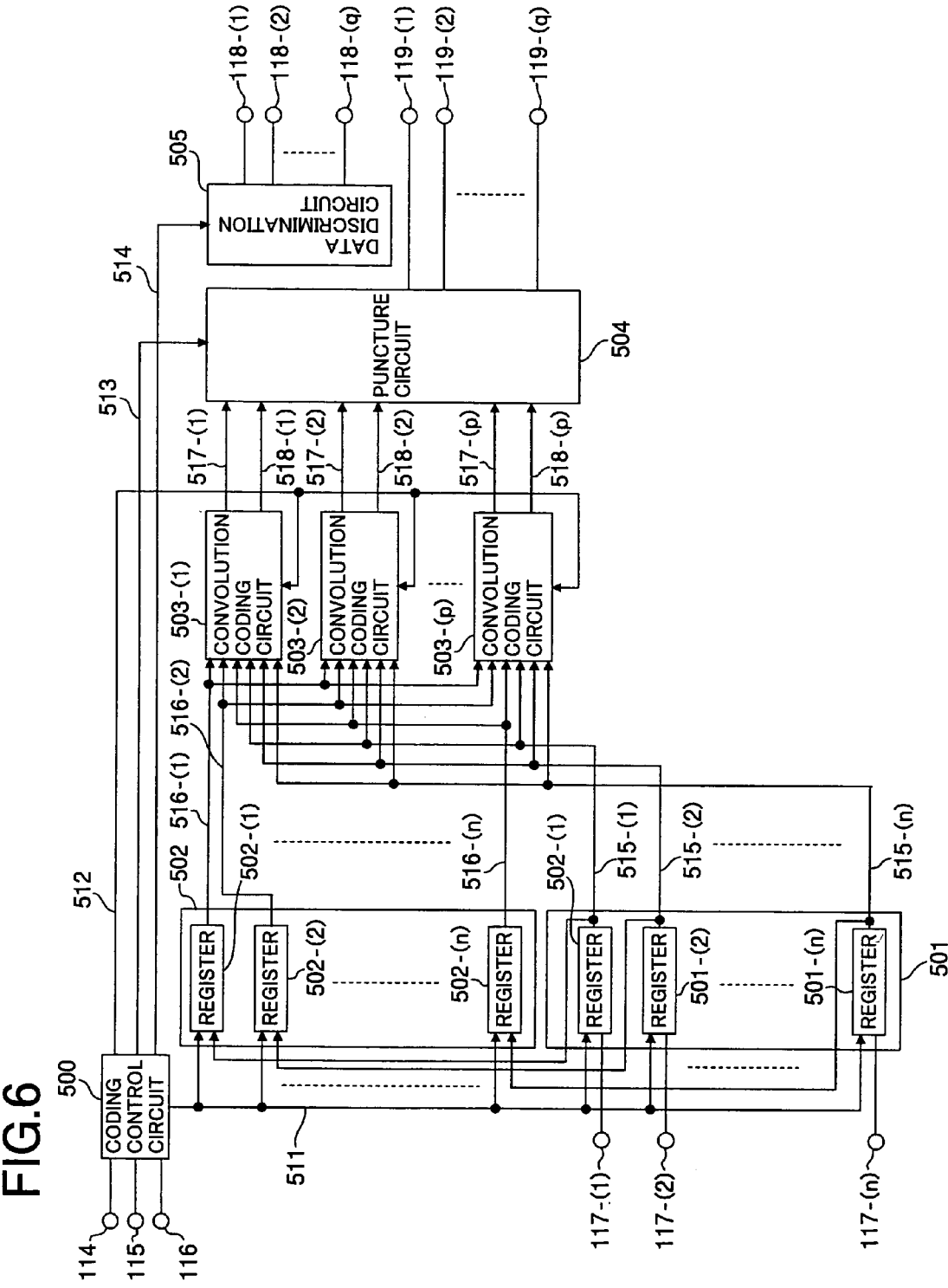
FIG. 6 is a block diagram showing a form of a coding unit shown in FIG. 1.

The coding unit 104 can be constructed, for example, in such a manner as shown in FIG. 6. Referring to FIG. 6, the coding unit 104 includes a coding control circuit 500, a first n-string register set 501, a second n-string register set 502, p convolution coding circuits 503-(1) to 503-(p), a puncture circuit 504, and a data discrimination circuit 505.

The coding control circuit 500 receives a clock timing over the coding operation clock line 114, receives an operation mode over the coding operation mode line 115 and receives an operation timing over the coding control line 116.

n registers 501-(1) to 501-(n) which form the first n-string register set 501 and n registers 502-(1) to 502-(n) which form the second n-string register set 502 both have an initial value of 0 placed therein.

The coding control circuit 500 which receives the clock timing and the operation timing outputs a signal over a register control line 511 so that the registers 501-(1) to 501-(n) of the first n-string register set 501 store data outputted to the data output lines 117-(1) to 117-(n) and output the stored data to first register data output lines 515-(1) to 515-(n), respectively, and the registers 502-(1) to 502-(n) of the second n-string register set 502 store the output data of the registers 501-(1) to 501-(n) of the first n-string register set 501 and output the stored data to second register data output lines 516-(1) to 516-(n), respectively.

The convolution coding circuits 503-(1) to 503-(p) receive the operation timing from the coding control circuit 500 over a convolution control line 512 and performs convolution coding processing for the data on the first register data output lines 515-(1) to 515-(n) and the second register data output lines 516-(1) to 516-(n). Convolution coding results are outputted to convolution coding output lines 517-(1) to 517-(p).

Here, the relationship between n and p coincides with the coding rate r. The coding rate r is a rate of the number X of bits of a transmission symbol of inputted transmission data to the number Y of bits of coded data to be actually transmitted with additional information added thereto, and is represented by r=X/Y. Thus, for example, where error correction additional information is produced by convolution coding processing to transmit transmission data inputted, the number of bits of the error correction additional information to be produced in order to transmit a transmission symbol of X bits as coded data of Y bits is given as Y−X. Therefore, where the coding rate r is r=½, coded data of 2 bits is produced from transmission data of 1 bit with additional information of 1 bit (Y−X=2−1=1).

The convolution coding circuits perform coding only at the coding rate=½, and therefore, n=2p.

The puncture circuit 504 is given a puncture processing operation mode from the coding control circuit 500 over a puncture control line 513, and fetches and performs puncture processing for the data of the coding rate r=½ outputted to the convolution coding output lines 517-(1) to 517-(p) of the convolution coding circuits 503-(1) to 503-(p).

Puncture processing results are outputted to the coded data output lines 119-(1) to 119-(q).

Further, the data discrimination circuit 505 receives the puncture processing operation mode from the coding control circuit 500 over a discrimination control line 514 and outputs validity of the data to the data discrimination control lines 118-(1) to 118-(q) corresponding to those of coded data output lines 119-(1) to 119-(q), respectively, which are valid.

Here, the puncture processing is described. The puncture processing is used to vary the coding rate r.

For example, if coding processing for transmission data of 3 bits is performed with the coding rate r=½, then coded data of 6 bits is produced. In other words, the coding rate can be represented as r=3/6. In the puncture processing, operation of varying the coding rate to r=¾ is performed by deleting arbitrary 2 bits from the coded data of 6 bits produced.

From this, the relationship between p and q is q=p where the coding rate is r=½, but q=3p/4 where the coding rate is r=¾.

Further, the coding control circuit 500 controls the first n-string register set 501 and the second n-string register set 502 over the register control line 511 so that data stored in the registers 501-(1) to 501-(n) of first n-string register set 501 are shifted to the registers 502-(1) to 502-(n) of the second n-string register set 502 at a clock timing, and then data outputted to the data output lines 117-(1) to 117-(n) are stored into the registers 501-(1) to 501-(n) of the first n-string register set 501 at a next clock timing. Then, the coding control circuit 500 repetitively performs coding processing while the operation time and the clock timing are supplied thereto.

Figure 7:
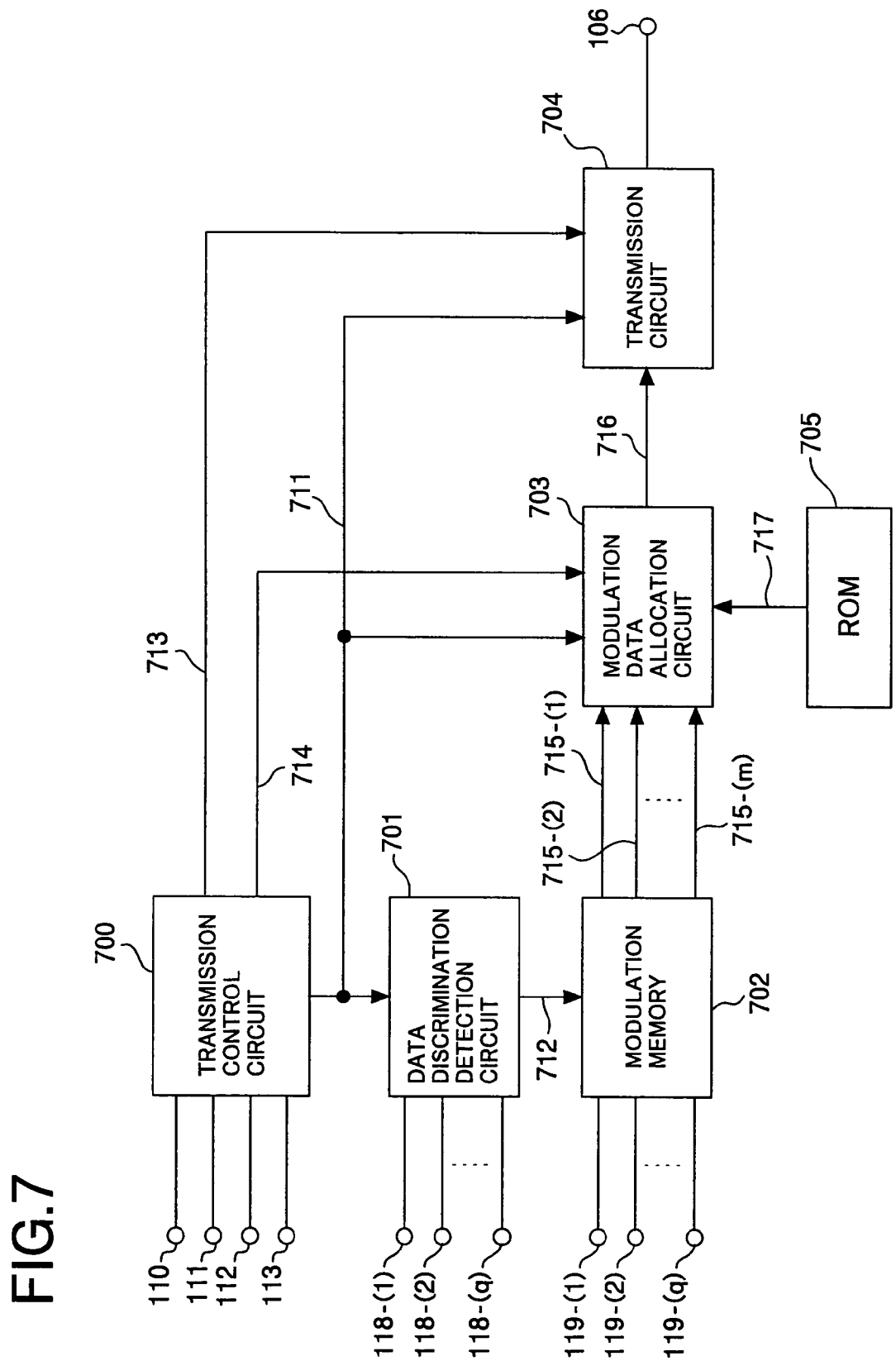
FIG. 7 is a block diagram showing a form of a transmitter shown in FIG. 1.
Figure 9:
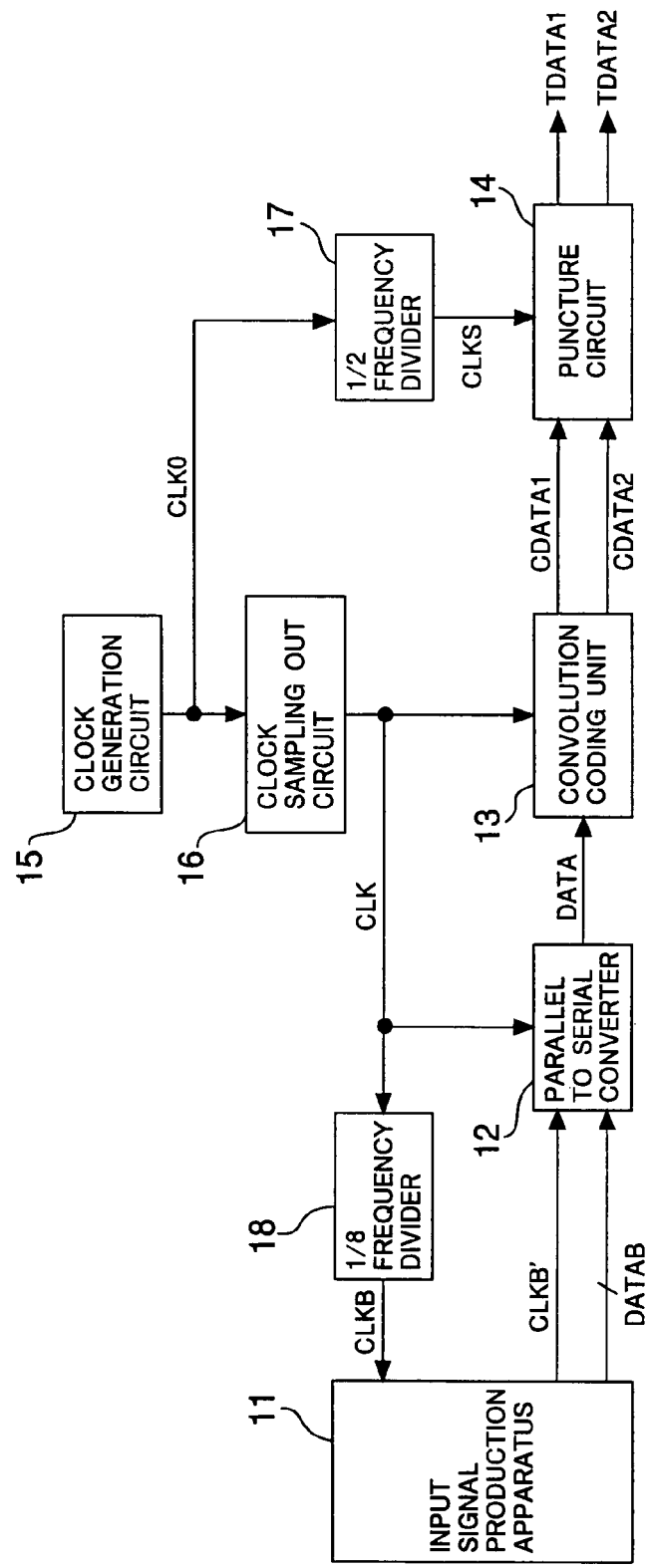
FIG. 9 is a block diagram of a conventional variable coding rate error correction transmission apparatus.

The transmitter 105 can be constructed, for example, in such a manner as shown in FIG. 7. Referring to FIG. 7, the transmitter 105 includes a transmission control circuit 700, a data discrimination detection circuit 701, a modulation memory 702, a modulation data allocation circuit 703, a transmission circuit 704, and a ROM 705.

The transmission control circuit 700 receives a clock timing over the transmission control clock line 110, receives an operation mode over the transmission operation mode line 111 and receives an operation timing over the transmission control line 112.

The transmission control circuit 700 outputs the clock timing to the circuits in the transmitter 105 over a transmission operation clock line 711.

The data discrimination detection circuit 701 instructs the modulation memory 702 so that data outputted to those of the coded data output lines 119-(1) to 119-(q) which are rendered valid by the data discrimination control lines 118-(1) to 118-(q) are written into the modulation memory 702 at a write timing given over a write control line 712.

Then, when an operation timing is received from the transmission output line 113, the transmission control circuit 700 provides an operation timing to the modulation data allocation circuit 703 over a modulation operation control line 714 to successively read out coded data to be modulated over coded data read lines 715-(1) to 715-(m) from the modulation memory 702.

The bit width of the coded data read out here depends upon the operation mode, and in BPSK, the number m of bits read out is m=1, but in 16QAM, the number m of bits read out is m=4.

The modulation data allocation circuit 703 reads out modulation data corresponding to the read out coded data from the ROM 705 over a modulation data read line 717 and outputs the same to the transmission circuit 704 over a modulation data output line 716.

When the operation timing is received from the transmission control circuit 700 over a transmission operation line 713, the transmission circuit 704 transmits the modulation data outputted from the modulation data allocation circuit 703 to the modulation data output line 716 at a clock timing given thereto from the transmission operation clock line 711 to the data output terminal 106.

While a preferred embodiment of the present invention has been described using specific terms, such description is for illustrative purposes only, and it is to be understood that changes and variations may be made without departing from the spirit or scope of the following claims.

What is claimed is:

1. A multi-rate transmission apparatus in which a coding ratio is varied in accordance with an input modulation operation mode to allow a transmission operation with a single input clock signal for any input modulation mode, comprising:

data processing means for reading in data having a bit width suitable for a modulation system corresponding to the input modulation mode;

coding means for performing coding processing parallely for the data read in by said data processing means; and transmission means for transmitting the data, for which the coding processing has been performed, in accordance with the modulation system and the varied coding ratio, wherein said coding means includes:

a register set for storing data of n-bit strings, n being a natural number;

a plurality of convolution coding circuits for fetching the data of n-bit strings from said register set and performing convolution processing for the data of n-bit strings in a unit of n-bit strings fixed;

a puncture circuit for performing puncture processing for coding results outputted from said plurality of convolution coding circuits and outputting coded data; and a data discrimination circuit for discriminating bits corresponding to the coded data outputted from said puncture circuit.

2. A multi-rate transmission apparatus as claimed in claim 1, wherein said data processing means includes:

a transmission memory for storing transmission data of m-bit strings where m is a natural number and varies in accordance with the modulation system;

means for assembling the data of m-bit strings into data of n-bit strings fixed to be used for coding processing, n being a natural number; and a memory for temporarily storing the data of n-bit strings.

3. A multi-rate transmission apparatus as claimed in claim 1, wherein said transmission means includes:

a transmission control circuit for determining a transmission timing;

a modulation data allocation circuit for allocating the coded data to modulation data; and a transmission circuit for transmitting the modulation data at a clock timing from said transmission control circuit.

* * * * *